(12) United States Patent
Sawada

(10) Patent No.: US 9,202,633 B2
(45) Date of Patent: Dec. 1, 2015

(54) LAMINATE TYPE ENERGY DEVICE AND METHOD OF MANUFACTURING THE SAME

(71) Applicant: ROHM CO., LTD., Kyoto (JP)

(72) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 199 days.

(21) Appl. No.: 13/971,164

(22) Filed: Aug. 20, 2013

(65) Prior Publication Data

US 2014/0055911 A1 Feb. 27, 2014

(30) Foreign Application Priority Data

Aug. 21, 2012 (JP) ................. 2012-181995

(51) Int. Cl.
| | |
|---|---|
| *H01G 9/00* | (2006.01) |
| *H01G 9/048* | (2006.01) |
| *H01G 11/26* | (2013.01) |
| *H01G 11/10* | (2013.01) |
| *H01G 11/76* | (2013.01) |
| *H01G 11/80* | (2013.01) |
| *H01G 11/82* | (2013.01) |

(52) U.S. Cl.
CPC ............. *H01G 9/048* (2013.01); *H01G 11/10* (2013.01); *H01G 11/26* (2013.01); *H01G 11/76* (2013.01); *H01G 11/80* (2013.01); *H01G 11/82* (2013.01); *Y02E 60/122* (2013.01); *Y02E 60/13* (2013.01)

(58) Field of Classification Search
USPC ......... 361/502, 503–504, 509–512, 516–519, 361/523–525, 528–529
See application file for complete search history.

(56) References Cited

U.S. PATENT DOCUMENTS

2010/0173194 A1 * 7/2010 Fujiya et al. .................. 429/178
2012/0251858 A1 * 10/2012 Kato et al. ...................... 429/82

FOREIGN PATENT DOCUMENTS

JP 2001-338848 12/2001

* cited by examiner

*Primary Examiner* — Nguyen T Ha
(74) *Attorney, Agent, or Firm* — Hamre, Schumann, Mueller & Larson, P.C.

(57) ABSTRACT

A laminate type energy device includes a plurality of cells, each having a laminated body of at least two layers laminated such that positive and negative electrodes are alternated, with a separator through which an electrolyte and ions are passed, interposed between the positive and negative active material electrodes, and positive and negative lead-out electrodes are exposed. Tab electrodes that allow electricity to flow outside of the laminate type energy device are joined to the lead-out electrodes via connecting portions. The cells are sealed by a sheathing laminate sheet via a sealing material covering at least the connecting portions.

13 Claims, 29 Drawing Sheets

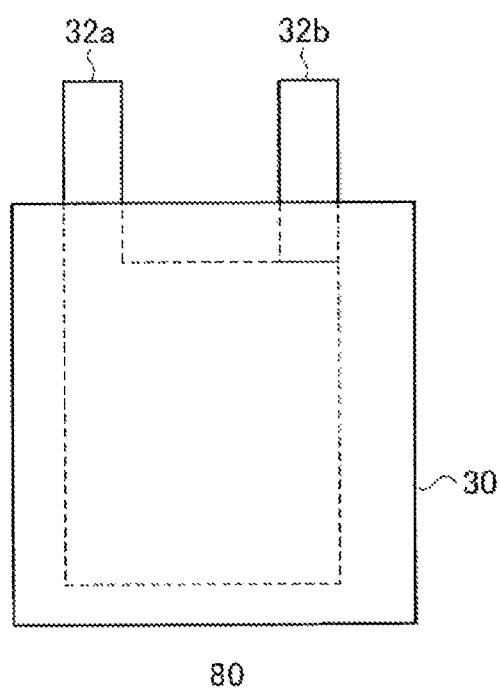

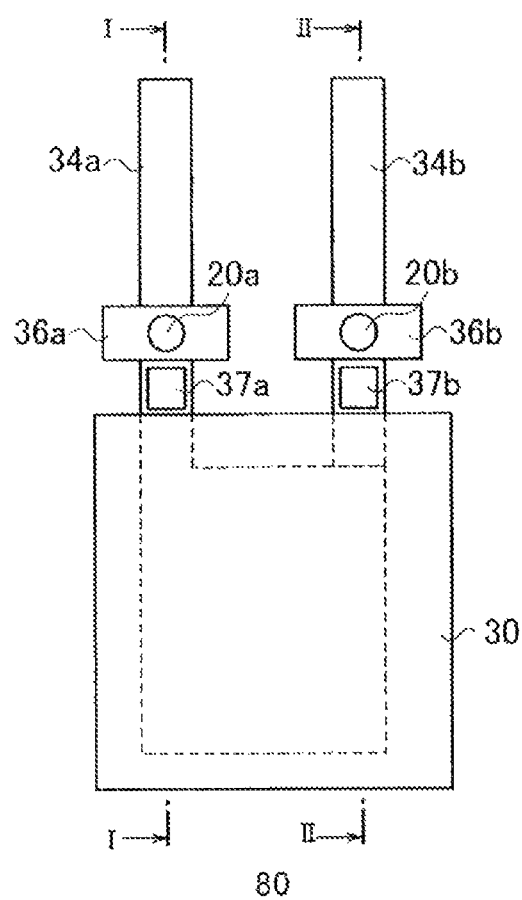

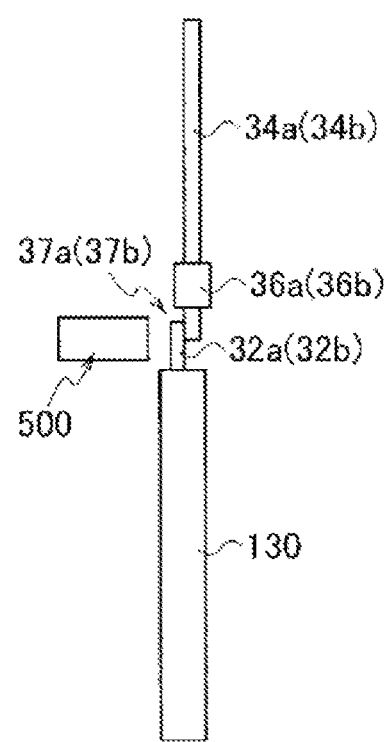

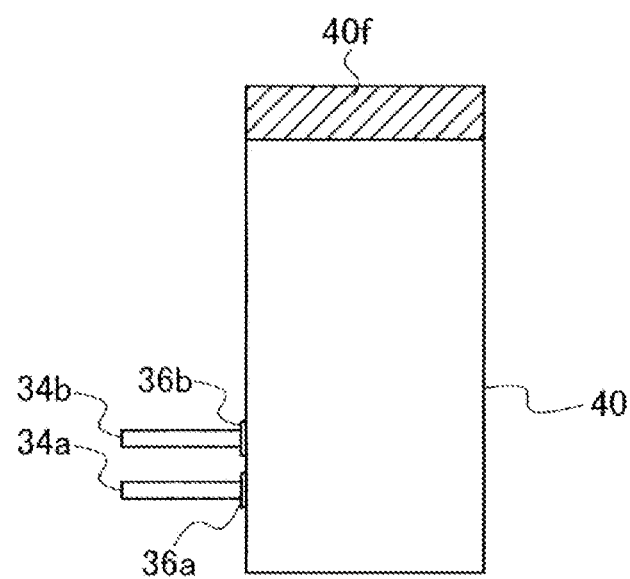

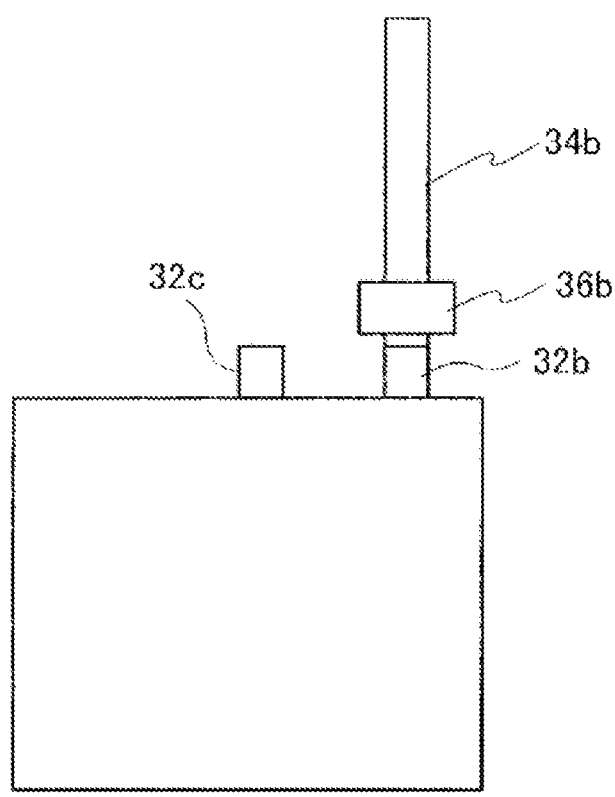

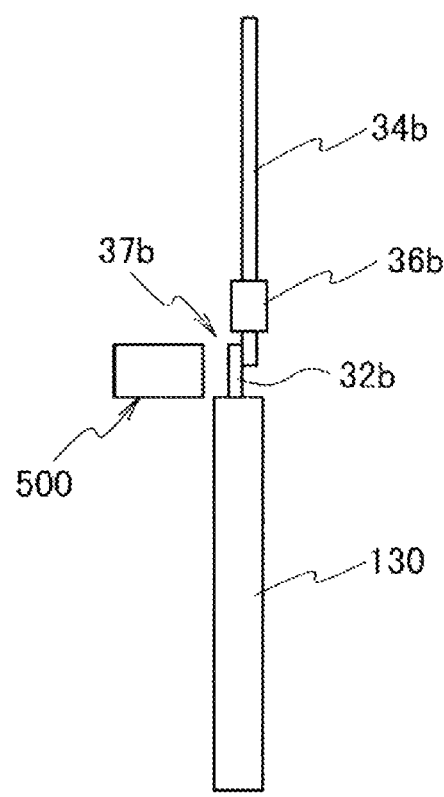

300a(300b)

LAMINATE TYPE ENERGY DEVICE AND METHOD OF MANUFACTURING THE SAME

CROSS-REFERENCE TO RELATED APPLICATION

This application is based upon and claims the benefit of priority from Japanese Patent Application No. 2012-181995, filed on Aug. 21, 2012, the entire contents of which are incorporated herein by reference.

TECHNICAL FIELD

The present disclosure relates to a laminate type energy device and a method of manufacturing the same, and more particularly relates to a laminate type energy device with improved insulation and airtightness and high durability and a method of manufacturing the same.

BACKGROUND

A laminate type energy device, an electric double layered capacitor and the like are known as a laminate type energy device. For example, a laminate type energy device includes a laminated body having laminated electrodes and separator and impregnated with an electrolyte, a laminate sheet (an aluminum laminate package) encapsulating the laminated body, and tab electrodes led from the laminated body out of the laminate sheet to allow the laminated body to be electrically connected to the outside.

An electric double layered capacitor has an advantage of long lifetime because it has low internal resistance. In addition, the electric double layered capacitor is capable of being charged/discharged in a short time and has low deterioration caused by charging/discharging.

There have been proposed various techniques for implementing the electric double layer capacitor.

As an example, a technique for providing a high-capacity thin capacitor is disclosed in which a required number of collector electrodes, each having polarizing electrode layers formed on a surface of a band-like metal foil and a required number of band-like separators are alternately stacked, the stack is folded, the separator is impregnated with an electrolyte to form an electric double layer capacitor element, the electric double layer capacitor element is encapsulated into a package, lead tabs made of thin metal are mechanically or electrically coupled to each collector electrode, and these lead tabs are drawn out via an encapsulation hole of the package.

However, in such a laminate type energy device, lead-out electrodes and tab electrodes constituting a collector electrode are welded to form positive and negative electrodes. In addition, encapsulation material (sealant) made of, for example, CPP (Cast PolyPropylene) a kind of thermoplastic resin, is wound on ends of the tab electrodes. In addition, when a sheathing laminate sheet coated with the CPP is used to encapsulate the entire storage device by heating an edge of the sheathing laminate sheet, the encapsulation material is melted together and the entire storage device is encapsulated.

However, in the above structure, since a step in a welding portion of the lead-out electrode and the tab electrodes constituting the collector electrode is only insulated by the CPP coated on the inner side of the sheathing laminate sheet, there is a high possibility of a short-circuit between the tab electrodes and the sheathing laminate sheet.

In addition, in the above structure, there is a possibility that a gap is produced between the tab electrodes and the sheathing laminate sheet, which may result in low airtightness and leakage of the electrolyte.

SUMMARY

The present disclosure provides some embodiments of a laminate type energy device which are capable of improving insulation, airtightness and durability, and a method of manufacturing the same.

According to one embodiment of the present disclosure, there is provided a laminate type energy device including a plurality of cells, each having a laminated body of at least two layers laminated such that positive and negative electrodes are alternated, with a separator through which an electrolyte and ions are passed, being interposed between the positive and negative active material electrodes, and negative lead-out electrodes are exposed. Tab electrodes that allow electricity to flow outside the laminate type energy device are joined to the lead-out electrodes via connecting portions. The entire cell is sealed by a sheathing laminate sheet via sealing material covering at least the connecting portions.

According to another embodiment of the present disclosure, there is provided a method of manufacturing a laminate type energy device, including connecting a plurality of cells, each of which has a laminated body of at least two layers laminated such that positive and negative electrodes are alternated, with a separator through which an electrolyte and ions are passed, being interposed between the positive and negative active material electrodes and positive and negative lead-out electrodes are exposed constituting; welding and joining tab electrodes that allow electricity to flow to the lead-out electrodes via connecting portions; disposing encapsulation material made of thermoplastic resin in end portions of the tab electrodes at the side of the cells; disposing plate or sheet-shaped thermoplastic resin constituting sealing material on front and rear surfaces of the connecting portions; covering the cells with a sheathing laminate sheet; thermally melting the encapsulation material and the sealing material and, at the same time, fusing edges of the sheathing laminate sheet in a state where an opening is formed in a portion of the sheathing laminate sheet; injecting an electrolyte into the sheathing laminate sheet through the opening; and fusing and encapsulating the opening.

BRIEF DESCRIPTION OF THE DRAWINGS

FIG. 3 is a plane view showing a schematic configuration of a laminated body included in the laminate type energy device.

FIG. 4A shows the tab electrode that does not have a tab electrode take-out hole and FIG. 4B shows the tab electrode that has the tab electrode take-out hole.

FIGS. 5A and 5B are plane views showing the laminated body in which the tab electrodes shown in FIG. 4A and FIG. 4B are joined to the positive and negative lead-out electrodes shown in FIG. 3, respectively.

FIG. 16 is a schematic view showing a state where an edge at a side where the opening exists is fused.

FIG. 17A is a front view showing a state where a tab electrode is joined to a lead-out electrode constituting a collector electrode in a first cell and 17B is a side view thereof, according to a second embodiment.

DETAILED DESCRIPTION

Figure 1:
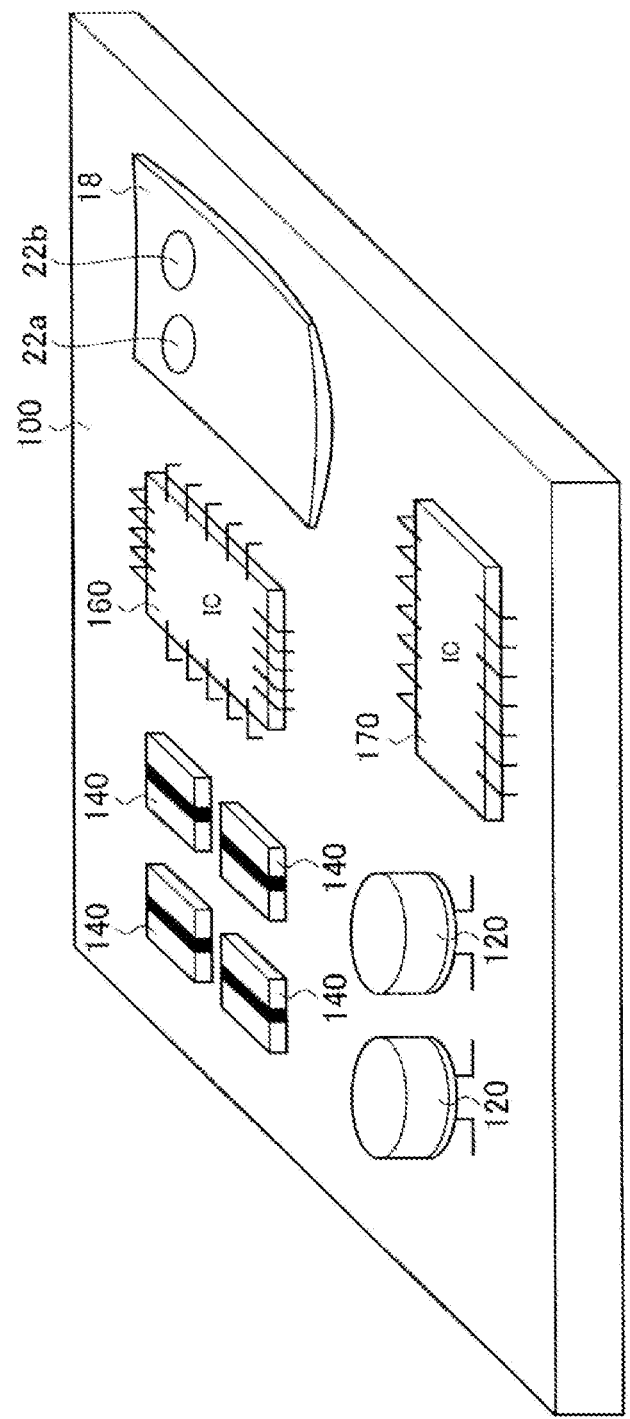
FIG. 1 is a perspective view showing a module board mounting a laminate type energy device according to a first embodiment.

Embodiments of the present disclosure will now be described in detail with reference to the drawings. Throughout the drawings, the same or similar elements are denoted by the same or similar reference numerals. It is however noted that the drawings are just schematic and relationships between thickness and planar dimension of elements, thickness ratios of various layers and so on may be unrealistic. Accordingly, detailed thickness and dimensions should be determined in consideration of the following description. In addition, it is to be understood that the figures include different dimensional relationships and ratios.

The following embodiments are provided to illustrate devices and methods to embody the technical ideas of the present disclosure and are not limited to materials, forms, structures, arrangements and so on of elements detailed herein. The embodiments of the present disclosure may be modified in different ways without departing from the spirit and scope of the invention defined in the claims.

First Embodiment
(Basic Structure of Laminate Type Energy Device)

A basic structure of a laminate type energy device according to a first embodiment will now be described with reference to FIGS. 1 to 10.

FIG. 1 is a perspective view showing a module board 100 mounting a laminate type energy device 18 according to the first embodiment.

The laminate type energy device 18 may include contact holes (joining holes) 22a and 22b for spot joining the laminate type energy device 18 to the module board 100, as illustrated in FIG. 1. It is assumed that the laminate type energy device 18 serves as a basic module and is mounted on the module board 100 which is a print board. As shown in FIG. 1, the module board 100 is mounted with, for example, IC chips 160 and 170, transformers 120, other device parts 140, etc., in addition to the laminate type energy devices 18.

The provision of the contact holes 22a and 22b contributes to mounting the laminate type energy device 18 in a limited space. In addition, since the spot joining is performed in the contact holes (joining holes) 22a and 22b when mounting the laminate type energy device 18 on the module board 100, it is possible to suppress a thermal load to an electrolyte with which a laminated body 80 (to be described later) included in the laminate type energy device 18 is impregnated and provide less contribution to coil components, thereby improving high frequency characteristics of the laminate type energy device 18.

Figure 2:
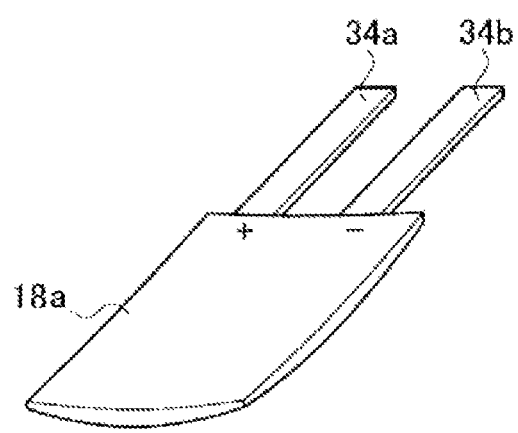
FIG. 2 is a perspective view showing a laminate type energy device which does not include a contact hole.

Although it is shown in FIG. 1 that the laminate type energy device 18 includes the contact holes 22a and 22b, the laminate type energy device 18 may not include the contact holes 22a and 22b. FIG. 2 is a perspective view showing a configuration of a laminate type energy device 18a which does not include the contact hole. The laminate type energy device 18a shown in FIG. 2 includes tab electrodes 34a and 34b that are extended out of the laminate type energy device 18a for taking out electricity to the outside of the laminate type energy device 18a.

FIG. 3 is a plane view showing a schematic configuration of the laminated body 80 included in the laminate type energy device 18. The laminated body 80 includes at least positive and negative lead-out electrodes 32a and 32b and a separator 30.

Figure 4A:
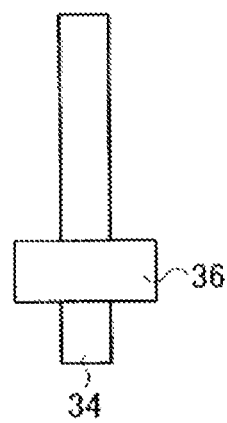
FIGS. 4A and 4B are plane views showing a tab electrode.
Figure 4B:
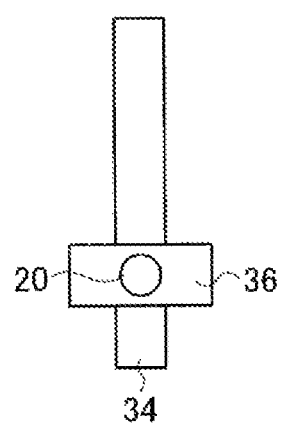

FIGS. 4A and 4B are plane views showing a tab electrode 34 (tab electrode 34a or 34b). The tab electrode 34 (34a or 34b) has an encapsulation material (sealant) 36 (encapsulation material 36a or 36b) attached thereto. FIG. 4A shows the tab electrode 34 (34a or 34b) that does not have a tab electrode take-out hole 20 (tab electrode take-out hole 20a or 20b) and FIG. 4B shows the tab electrode 34 (34a or 34b) that has the tab electrode take-out hole 20 (20a or 20b) in the encapsulation material 36 (36a or 36b).

The tab electrode take-out hole 20 (20a or 20b) is formed by removing a portion of the encapsulation material 36 (36a or 36b) of the tab electrode 34 (34a or 34b) made of aluminum, which are connected to the lead-out electrode 32 (32a or 32b) made of aluminum, until the aluminum material of the tab electrode 34 (34a or 34b) is exposed.

The laminated body 80 of the laminate type energy device 18 is sealed by stacking and compressing a laminate (sheathing laminate sheet) 40 (to be described later) on front and rear surfaces of the laminated body 80. The laminate 40 that seals the laminated body 80 also has holes arranged in alignment with the tab electrode take-out holes 20a and 20b. These holes in the laminate 40 correspond to the contact holes 22a and 22b of the laminate type energy device 18. In addition, the holes formed in the laminate 40 and the tab electrode take-out holes 20a and 20b do not necessarily have a circular shape but may have any desired shape.

Figure 5B:
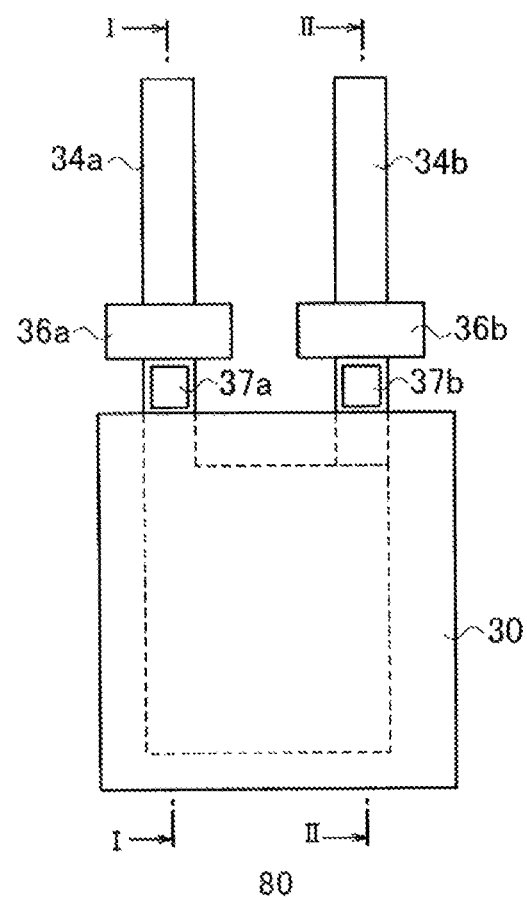

FIGS. 5A and 5B are plane views showing the laminated body 80 in which the tab electrodes 34a and 34b shown in FIG. 4A and FIG. 4B are joined to the positive and negative lead-out electrodes 32a and 32b shown in FIG. 3, respectively. In FIGS. 5A and 5B, the tab electrodes 34a and 34b are joined to the positive and negative lead-out electrodes 32a and 32b at connecting portions 37a and 37b, respectively.

Figure 6:
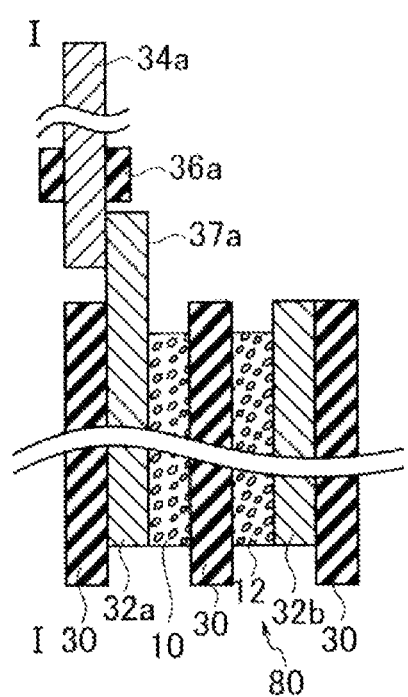
FIG. 6 is a sectional view taken along line I-I of the laminated body in FIG. 3.
Figure 7:
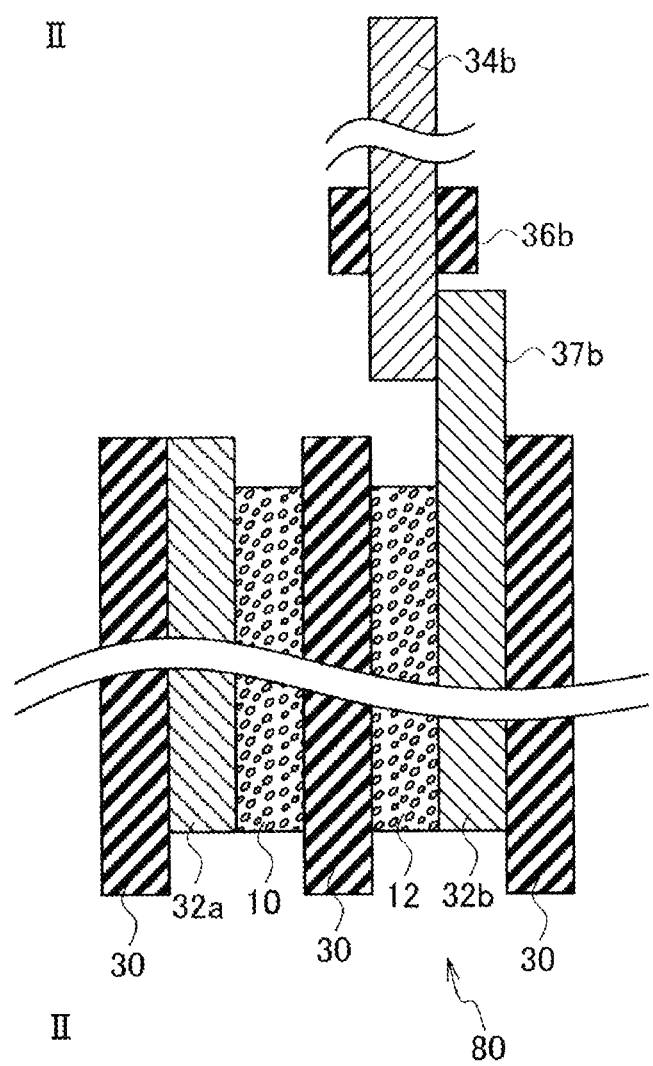
FIG. 7 is a sectional view taken along line II-II of the laminated body in FIG. 3.

FIG. 6 is a sectional view taken along line I-I of the laminated body 80 shown in FIG. 5A, and FIG. 7 is a sectional view taken along line II-II of the laminated body 80 shown in FIG. 5A.

As shown in FIGS. 6 and 7, an internal electrode structure (for example, a storage element) of the laminated body 80 has a multi-layered structure in which multiple layers are laminated in such a manner that a positive active material electrode 10 and a negative active material electrode 12 are alternated with the separator 30 through which ions of an electrolyte are passed being interposed therebetween and the positive and negative lead-out electrodes 32a and 32b are connected to the positive and negative active material electrodes 10 and 12, respectively. The lead-out electrodes 32a and 32b are exposed to the outside of the laminated body 80. In FIGS. 6 and 7, the separators 30 are also stacked on both outermost surfaces of the laminated body 80. However, these separators 30 stacked on both outermost surfaces of the laminated body 80 may be omitted. Although, the lead-out electrodes 32a and 32b are shown to be connected to the positive and negative active material electrodes 10 and 12, the lead-out electrodes 32a and 32b may be integrated into the positive and negative active material electrodes 10 and 12, respectively. Further, although only one pair of the positive and negative active material electrodes 10 and 12 are shown in FIGS. 6 and 7, the laminated body 80 may include two or more pairs of the positive and negative active material electrodes 10 and 12 stacked in series.

The separator 30 may be required to have heat resistance if it needs to cope with reflow. The separator 30 may be made of celluloses or the like if heat resistance is needed. Otherwise, if heat resistance is not needed, the separator 30 may be made of polypropylene.

(Example Configuration of Laminate Type Energy Device)

An example configuration of the laminate type energy device 18 according to the first embodiment will now be described with reference to FIGS. 8 to 13.

The laminate type energy device 18 according to the first embodiment may include a plurality of storage devices (single cells) 130, each of which includes the laminated body 80 of at least two layers laminated such that the positive and negative electrodes 10 and 12 are alternated with the separator 30 interposed therebetween, and the positive and negative lead-out electrodes 32a and 32b are exposed. The tab electrodes 34a and 34b for taking out electricity are joined to the positive and negative lead-out electrodes 32a and 32b via the connecting portions 37a and 37b, respectively. The plurality of storage devices 130 are sealed by the sheathing laminate sheet 40 and sealing material 200 (200a and 200b) covering at least the connecting portions 37a and 37b.

Figure 8A:
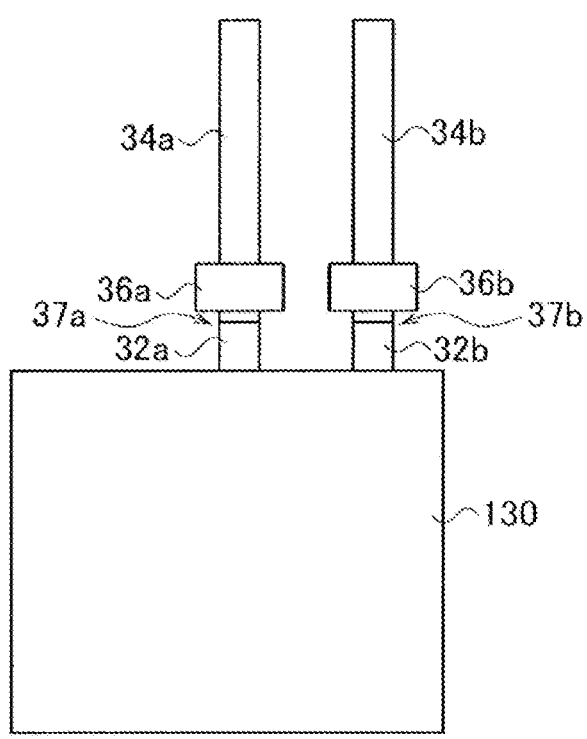
FIG. 8A is a front view showing a state where tab electrodes are joined to positive and negative electrodes and 8B is a side view thereof.

FIG. 8A is a front view showing a state where the tab electrodes 34a and 34b are joined to the positive and negative lead-out electrodes 32a and 32b, respectively.

The encapsulation material (sealant) 36a and 36b made of thermoplastic resin such as polypropylene (for example, CPP (Cast PolyPropylene)) or the like are provided at end portions of the tab electrodes 34a and 34b.

As shown in FIG. 8B, the connecting portions 37a and 37b between the positive and negative lead-out electrodes 32a and 32b and the tab electrodes 34a and 34b may be welded by, for example, a welding horn 500 of an ultrasonic welder (not shown).

Figure 9:
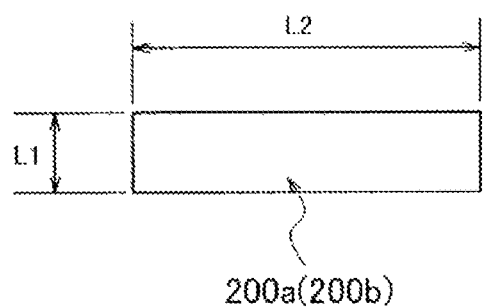
FIG. 9 is a plane view showing sealing material made of plate or sheet-shaped thermoplastic resin.

FIG. 9 is a plane view showing plate or sheet-shaped sealing material 200 (200a or 200b). The plate or sheet-shaped sealing material 200 (200a or 200b) may be made of thermoplastic resin in this embodiment.

An example of the thermoplastic resin may include the above-described CPP or the like.

A size of the sealing material 200 (200a or 200b) is not particularly limited as long as it can cover the connecting portion (welding portion) 37a and 37b when it is mounted on the connecting portion 37a and 37b. For example, the sealing material 200 may have the longitudinal dimension L1 of about 3 mm and the lateral dimension L2 of about 12 mm. In addition, a thickness of the sealing material 200 (200a and 200b) is not particularly limited. For example, the thickness may be about 50 μm.

The plate or sheet-shaped sealing material 200 (200a or 200b) made of thermoplastic resin is placed on the front and rear surfaces of the connecting portion 37a and 37b, thermally melt in that state, and solidified, as will be described later.

Figure 10:
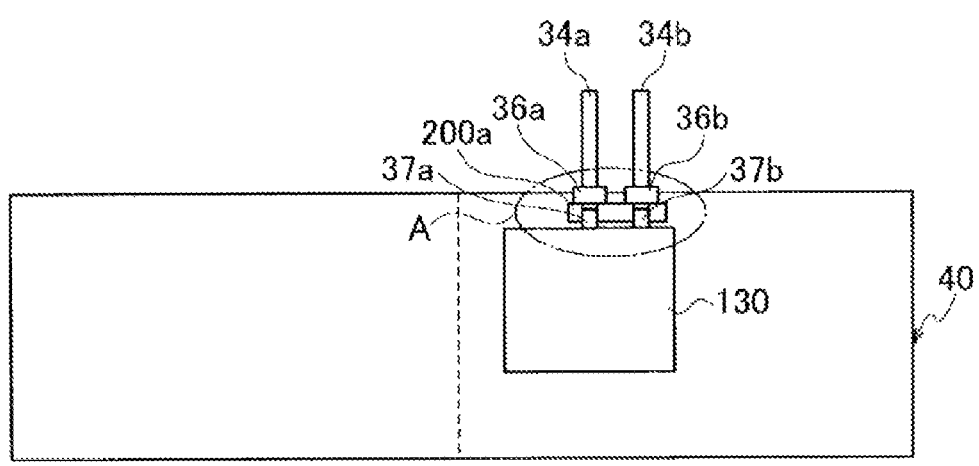
FIG. 10 is a plane view showing a state where a storage device in which the tab electrodes are joined to the positive and negative electrodes is mounted on a sheathing laminate sheet.

As shown in FIG. 10, the storage device 130 in which the tab electrodes 34a and 34b are joined to the positive and negative lead-out electrodes 32a and 32b are mounted on the sheathing laminate sheet 40, and the sealing material 200a shown in FIG. 8 is placed on the sheathing laminate sheet 40 in such a manner to cover the rear surface of the connecting portions (welding portions) 37a and 37b of the positive and negative lead-out electrodes 32a and 32b and the tab electrodes 34a and 34b.

Figure 11A:
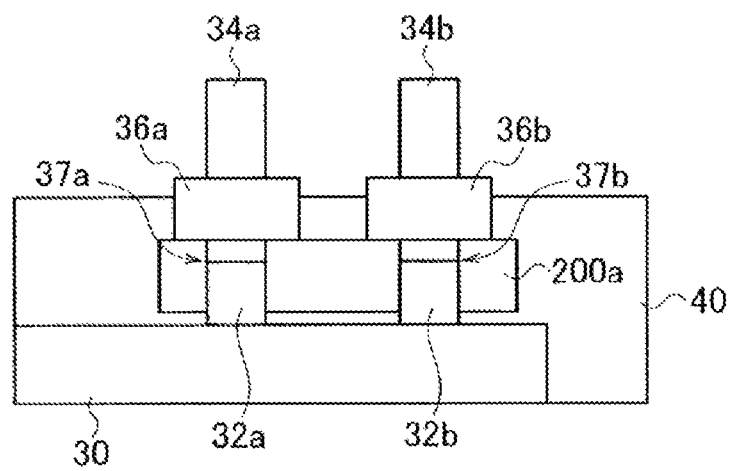
FIG. 11A is an enlarged view of portion A in FIGS. 10 and 11B is a side view thereof.
Figure 11B:
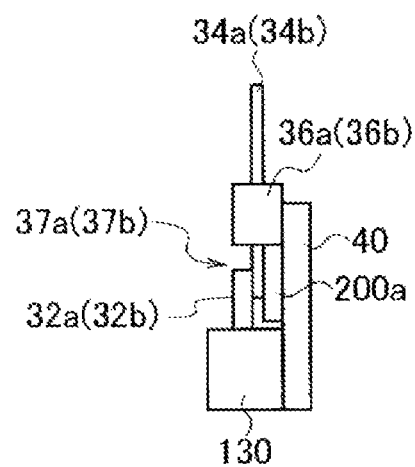

FIG. 11A is an enlarged view of a portion A of FIG. 10, and FIG. 11B is a side view thereof.

The sheathing laminate sheet 40 includes, for example, a thermoplastic resin film and a high melting point resin film, with a metal foil interposed therebetween, and can cover the storage device 130 such that the high melting point resin film lies in the outer side.

Figure 12:
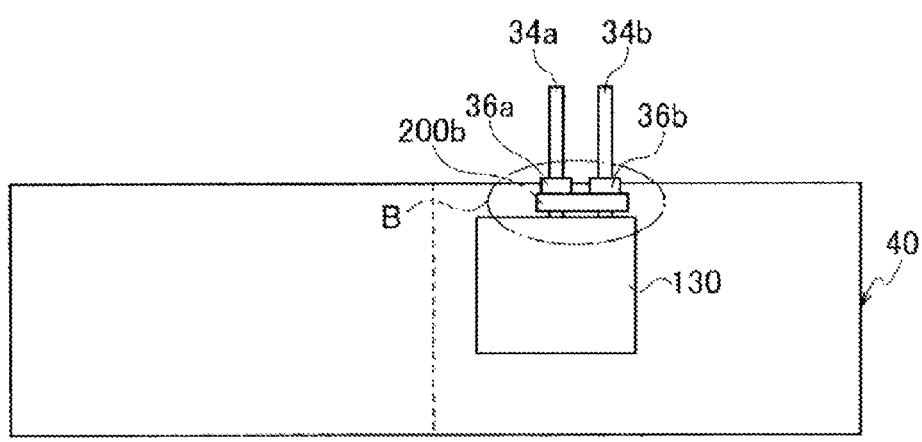
FIG. 12 is a plane view showing a state where the sealing material shown in FIG. 8 is mounted to cover connecting portions of the positive and negative electrodes and the tab electrodes.

Thereafter, as shown in FIG. 12, the sealing material 200*b* shown in FIG. 8 is mounted to cover the front surface of the connecting portions (welding portions) 37*a* and 37*b* of the positive and negative lead-out electrodes 32*a* and 32*b* and the tab electrodes 34*a* and 34*b*.

Figure 13A:
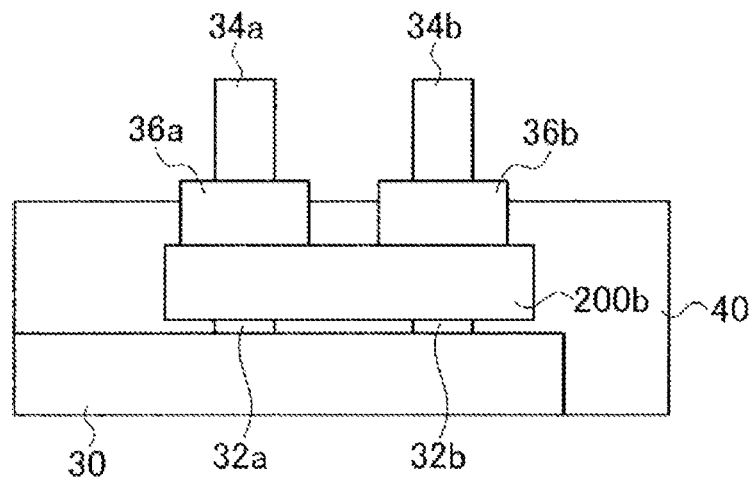
FIG. 13A is an enlarged view of portion B in FIGS. 12 and 13B is a side view thereof.
Figure 13B:
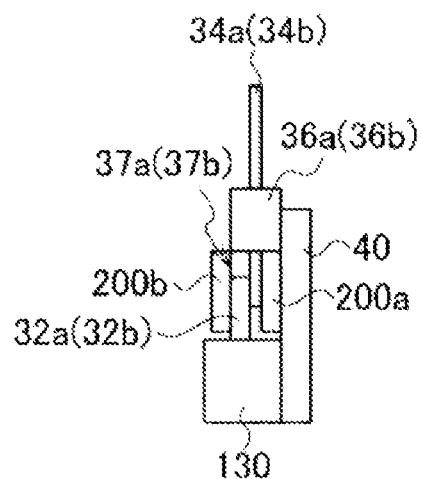

FIG. 13A is an enlarged view of a portion B in FIG. 12 and FIG. 13B is a side view thereof.

Accordingly, the connecting portions (welding portions) 37*a* and 37*b* of the positive and negative lead-out electrodes 32*a* and 32*b* and the tab electrodes 34*a* and 34*b* are interposed between the sealing material 200*a* at the rear surface and the sealing material 200*b* at the front surface (see FIG. 13B).

Figure 14:
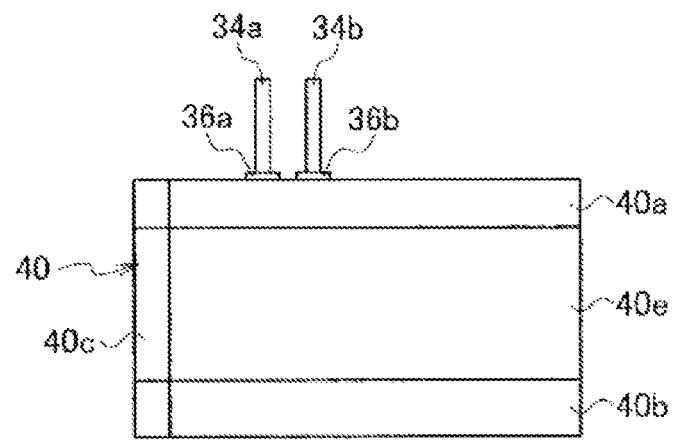
FIG. 14 is a schematic view showing a state where edges of the sheathing laminate sheet are fused in a state where an opening is formed in a portion of the sheathing laminate sheet.

FIG. 14 is a schematic view showing a state where edges 40*a*, 40*b* and 40*c* of the sheathing laminate sheet 40 are fused in a state where an opening 40*e* is formed in a portion of the sheathing laminate sheet 40.

When the edge 40*a* of the sheathing laminate sheet 40 is fused, the encapsulation material (sealant) 36*a* and 36*b* is melt at the same time when the sealing material 200*a* and 200*b* is thermally melt, and the encapsulation material (sealant) 36*a* and 36*b* and the sealing material 200*a* and 200*b* are integrated to seal a gap between the sheathing laminate sheet 40, the positive and negative lead-out electrodes 32*a* and 32*b*, the tab electrodes 34*a* and 34*b* and the connecting portions (welding portion) 37*a* and 37*b*.

A heating temperature may be, for example, about 200 degrees C. A width for heating (fusing) area may be, for example, about 5 to 6 mm.

Figure 15:
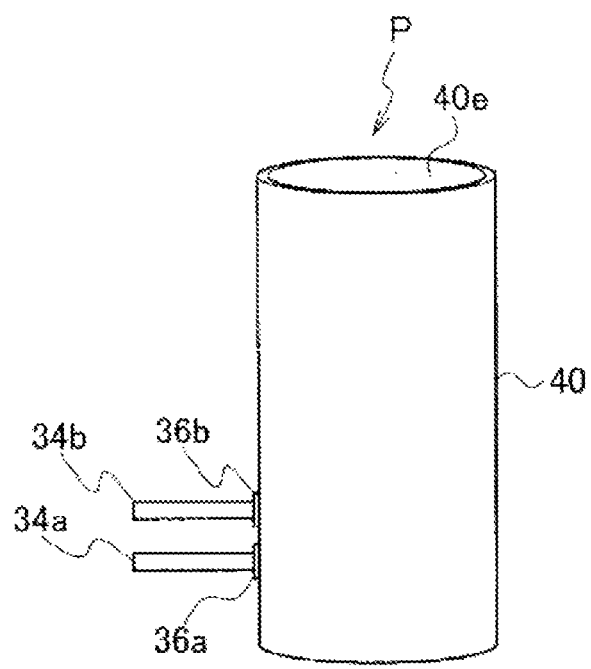
FIG. 15 is a perspective view showing a state where an electrolyte is injected into the sheathing laminate sheet through the opening.

Then, an electrolyte P is injected into the sheathing laminate sheet 40 through the opening 40*e*, as shown in FIG. 15, and an edge 40*f* at a side where the opening 40*e* exists is fused, as shown in FIG. 16, to complete the laminate type energy device 18 according to this embodiment.

The above-configured laminate type energy device 18 according to this embodiment can prevent a short circuit from being produced between the tab electrodes 34*a* and 34*b* and the sheathing laminate sheet 40 since a step in the connecting portions (welding portions) 37*a* and 37*b* of the positive and negative lead-out electrodes 32*a* and 32*b* and the tab electrodes 34*a* and 34*b* is covered by the sealing material 200 (200*a* and 200*b*) and completely insulated in a solidification process.

In addition, since the gap between the tab electrodes 34*a* and 34*b* and the sheathing laminate sheet 40 is completely blocked when the encapsulation material (sealant) 36*a* and 36*b* and the sealing material 200*a* and 200*b* are melt in the solidification process, it is possible to improve airtightness and prevent an electrolyte P (which will be described later) from being leaked out.

In this way, according to this embodiment, it is possible to improve durability of the laminate type energy device 18.

In addition, in this embodiment, the positive and negative lead-out electrodes 32*a* and 32*b* of each cell 130 may be configured such that their respective positive and negative poles are interconnected to connect a plurality of cells 130 in series.

Alternatively, in this embodiment, the positive and negative lead-out electrodes 32*a* and 32*b* of each cell 130 may be configured such that their respective positive poles are connected to each other and their respective negative poles are connected to each other to connect a plurality of cells 130 in parallel.

(Method of Manufacturing the Laminate Type Energy Device)

The laminate type energy device 18 according to the first embodiment may be manufactured according to the following process.

Specifically, the process includes:

(a) a step of connecting in parallel a plurality of single cells 130, each of which includes the laminated body 80 of at least two layers laminated such that the positive and negative active material electrodes 10 and 12 are alternated with the separator 30 through which an ions of an electrolyte are passed, interposed between the positive and negative active material electrodes 10 and 12, and the positive and negative lead-out electrodes 32*a* and 32*b* are exposed, (b) a step of joining the tab electrodes 34*a* and 34*b* for taking out electricity to the positive and negative lead-out electrodes 32*a* and 32*b*, respectively, by welding (see FIG. 8B), (c) a step of disposing the encapsulation material 36*a* and 36*b* made of thermoplastic resin in end portions of the tab electrodes 34*a* and 34*b* at the side of the single cells 130, respectively (see FIG. 8A, etc.), (d) a step of disposing the sealing material 200*a* and 200*b* of plate or sheet-shaped thermoplastic resin on the front and rear surfaces of the connecting portions (welding portion) 37*a* and 37*b*, respectively (see FIGS. 9 to 13), (e) a step of disposing the laminate sheet 40 on the front and rear surfaces of the single cells 130, respectively (see FIG. 14), (f) a step of thermally melting the encapsulation material 36*a* and 36*b* and the sealing material 200*a* and 200*b* and, at the same time, fusing edges 40*a*, 40*b* and 40*c* of the laminate sheet 40 in a state where an opening 40*e* is formed in a portion of the laminate sheet 40 (see FIG. 14), (g) a step of injecting the electrolyte P into the laminate sheet 40 through the opening 40*e* (see FIG. 15), and (h) a step of fusing and sealing the opening 40*e* (see FIG. 16).

In addition, the step of fusing and sealing the opening 40*e* may be performed in vacuum. When the step of fusing and sealing the opening 40*e* is performed in vacuum, it is pressed down by the atmospheric pressure to improve adhesion property of the single cells 130.

The number of the single cells 130 connected in parallel may be two or more.

[Second Embodiment]

(Example Configuration of Laminate Type Energy Device)

A laminate type energy device according to a second embodiment will now be described with reference to FIGS. 17 to 25.

The laminate type energy device according to the second embodiment has the same basic structure as the laminate type energy device 18 according to the first embodiment, and therefore, explanation of which will not be repeated.

The laminate type energy device according to the second embodiment includes a plurality of storage devices (cells) 130, each of which includes a laminated body of at least two layers laminated such that positive and negative active material electrodes are alternated, with a separator through which an electrolyte and ions are passed, interposed between the positive and negative active material electrodes, and lead-out electrodes 32*a*, 32*b* and 32*c* are exposed. Tab electrodes 34*a*, 34*b* and 34*c* for taking out electricity are joined to the lead-out electrodes 32*a*, 32*b* and 32*c* via connecting portions 37*a*, 37*b* and 37*c*, respectively. The entire cells 130 are sealed by a sheathing laminate sheet 40 via sealing material 300 (300*a* or 300b) covering at least the connecting portions 37a, 37b and 37c, and an electrolyte P is injected into the sheathing laminate sheet 40.

FIG. 17A is a front view showing a state where the tab electrode 34b is joined to the lead-out electrodes 32b constituting a collector electrode in a first cell. Although it is shown in FIG. 17A that only the tab electrode 34b is joined to the lead-out electrodes 32b, the tab electrode 34c may also be joined to the lead-out electrodes 32c.

Encapsulation material (sealant) 36b made of thermoplastic resin is provided at an end portion of the tab electrode 34b. The thermoplastic resin used here may be a CPP or the like, as in the first embodiment.

As shown in FIG. 17B, the connecting portion 37b of the lead-out electrode 32b and the tab electrode 34b may be a welding portion welded by, for example, a welding horn 500 of an ultrasonic welder (not shown).

Figure 18A:
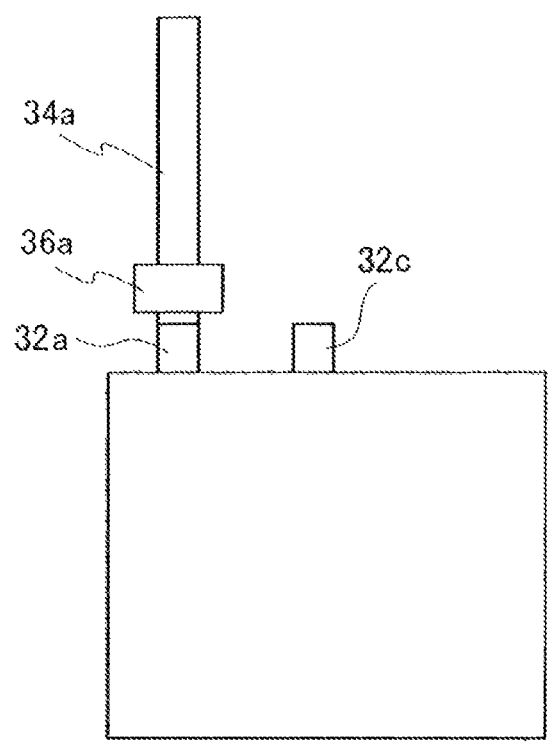
FIG. 18A is a front view showing a state where the tab electrodes is joined to a lead-out electrode constituting a collector electrode in a second cell and 18B is a side view thereof.

FIG. 18A is a front view showing a state where the tab electrode 34a is joined to the lead-out electrodes 32a constituting a collector electrode in a second cell. Although it is shown in FIG. 18A that only the tab electrode 34a is joined to the lead-out electrodes 32a, the tab electrode 34c may also be joined to the lead-out electrodes 32c.

Encapsulation material (sealant) 36a made of thermoplastic resin is provided at an end portion of the tab electrode 34a. The thermoplastic resin used here may be a CPP or the like, as in the first embodiment.

Figure 18B:
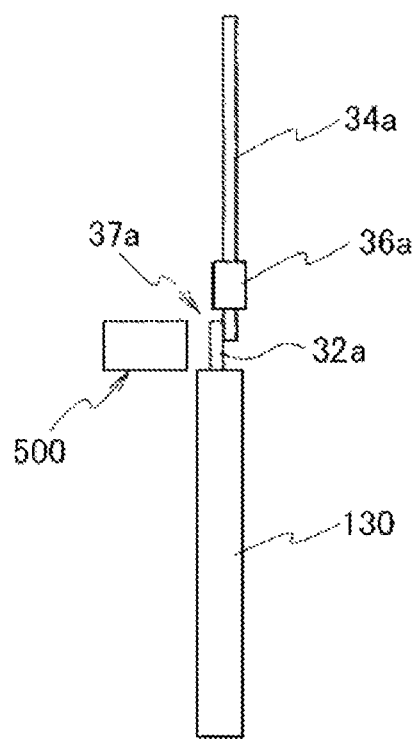

As shown in FIG. 18B, the connecting portion 37a of the lead-out electrode 32a and the tab electrode 34a may be a welding portion welded by, for example, a welding horn 500 of an ultrasonic welder (not shown).

Figure 19A:
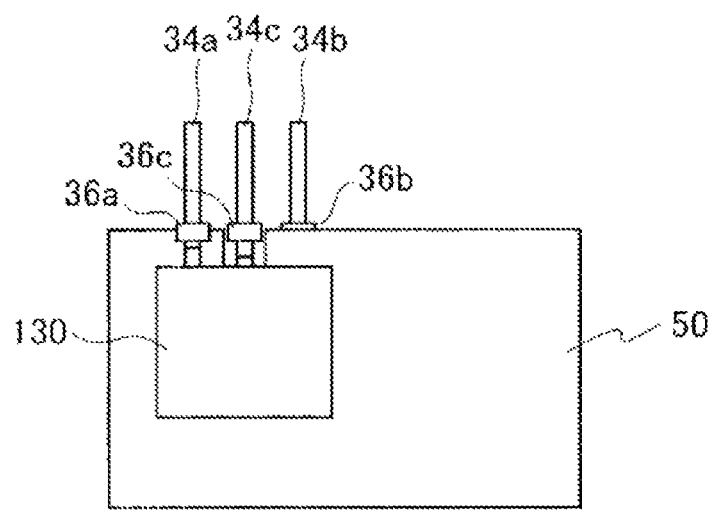
FIG. 19A is a front view showing a state where the first cell is overlapped with and joined to the second cell with an intermediate laminate interposed therebetween and 19B is a side view thereof, according to the second embodiment.
Figure 19B:
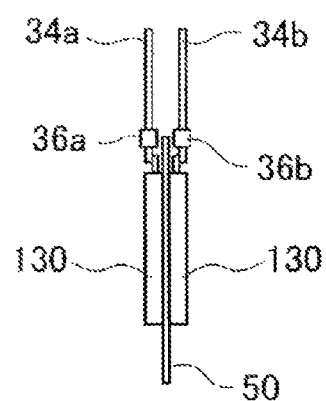

FIG. 19A is a front view showing a state where the first cell shown in FIG. 17 is overlapped with and joined to the second cell shown in FIG. 18 with an intermediate laminate 50 interposed therebetween, and FIG. 19B is a side view thereof.

An insulating film or the like may be used for the intermediate laminate 50.

Figure 20:
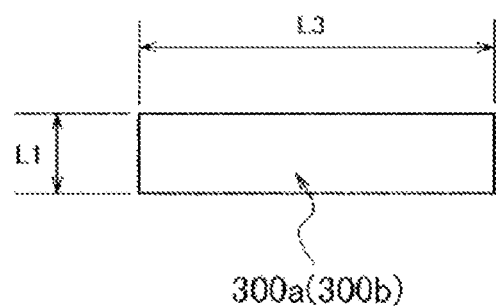
FIG. 20 is a plane view showing sealing material made of plate or sheet-shaped thermoplastic resin.

FIG. 20 is a plane view showing plate or sheet-shaped sealing material 300 (300a or 300b) made of thermoplastic resin used in this embodiment.

An example of the thermoplastic resin used may include the above-mentioned CPP or the like.

A size of the sealing material 300 (300a or 300b) is not particularly limited as long as it can cover the connecting portions (welding portions) 37a, 37b and 37c when it is mounted. For example, the sealing material 300 may have the longitudinal dimension L1 of about 3 mm and the lateral dimension L2 of about 18 mm. In addition, a thickness of the sealing material 300 (300a or 300b) is not particularly limited. For example, the thickness may be about 50 μm.

The plate or sheet-shaped sealing material 300 (300a or 300b) made of thermoplastic resin is placed on the front and rear surfaces of the connecting portions (welding portions) 37a, 37b and 37c, thermally melt in that state, and solidified, as will be described later.

Figure 21:
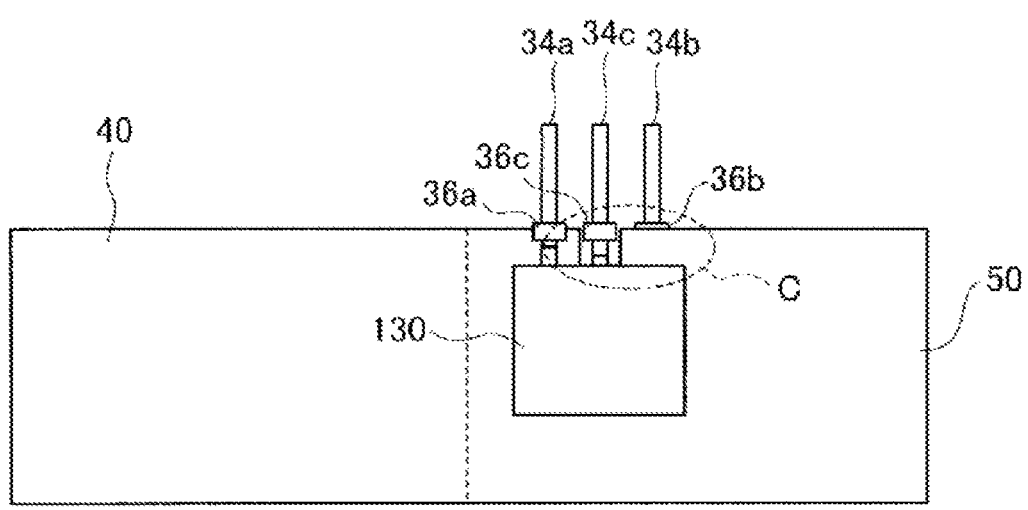
FIG. 21 is a plane view showing a state where a storage device in which tab electrodes are joined to the lead-out electrodes is mounted on a sheathing laminate sheet.
Figure 22A:
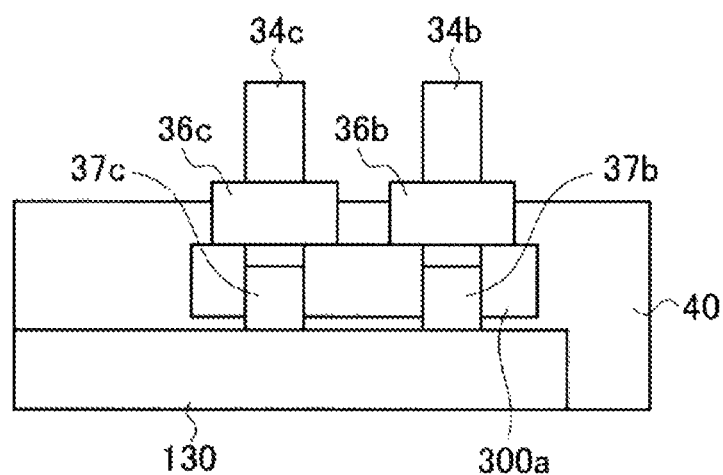
FIG. 22A is an enlarged view of portion C in FIGS. 21, and 22B is a side view thereof.

That is, as shown in FIGS. 21, 22A and B, the storage device 130 in which the tab electrodes 3ba and 34c are joined to the lead-out electrodes 32b and 32c are mounted on the sheathing laminate sheet 40 and the sealing material 300a shown in FIG. 20 is placed on the sheathing laminate sheet 40 in such a manner to cover the rear surfaces of the connecting portions (welding portions) 37b and 37c of the lead-out electrodes 32b and 32c and the tab electrodes 34b and 34c.

Figure 22B:
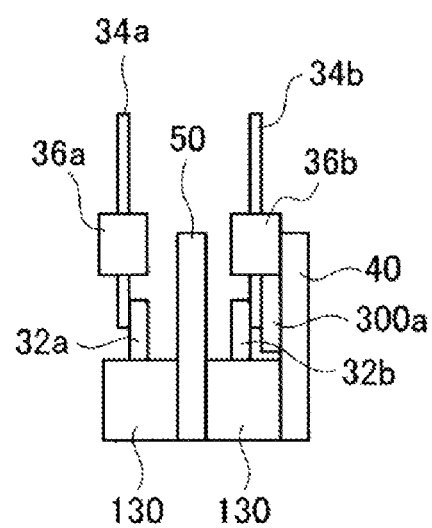

FIG. 22A is an enlarged view of a portion C in FIG. 21 and FIG. 22B is a side view thereof. Although it is not shown in FIG. 22B, the sealing material 300b shown in FIG. 20 may also be placed on the front surfaces of the connecting portions (welding portions) 37b and 37c of the lead-out electrodes 32b and 32c and the tab electrodes 34b and 34c.

The sheathing laminate sheet 40 includes, for example, a thermoplastic resin film and a high melting point resin film, with a metal foil interposed therebetween, such that the high melting point resin film lies in the outer side and covers the connected cells 130.

Figure 23:
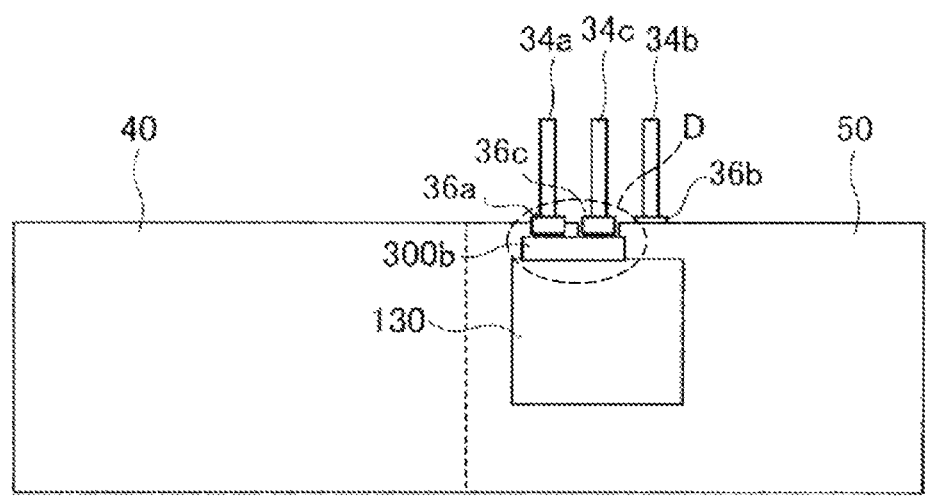
FIG. 23 is a plane view showing a state where the sealing material shown in FIG. 20 is mounted to cover connecting portions of the lead-out electrodes and the tab electrodes.
Figure 24A:
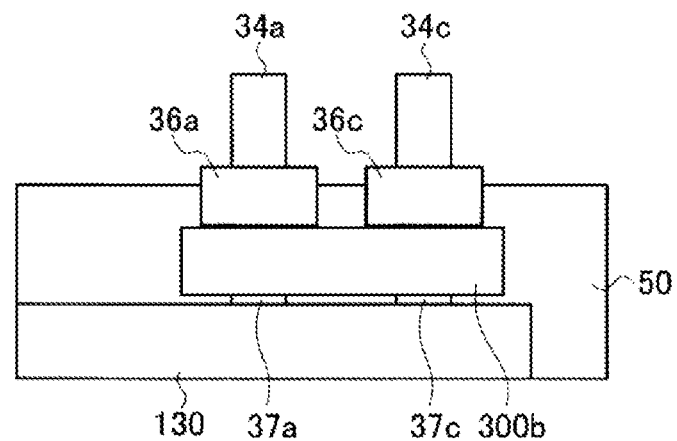
FIG. 24A is an enlarged view of portion D in FIGS. 23 and 24B is a side view thereof.
Figure 24B:
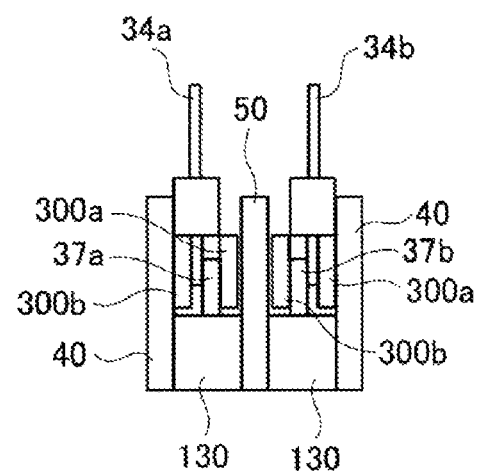

Subsequently, as shown in FIGS. 23, 24A and 24B, the sealing material 300b shown in FIG. 20 is mounted to cover the front surfaces of the connecting portions (welding portions) 37a and 37c of the lead-out electrodes 32a and 32c and the tab electrodes 34a and 34c.

FIG. 24A is an enlarged view of a portion D in FIG. 23, and FIG. 24B is a side view thereof. As shown in FIG. 24B, the sealing material 300a shown in FIG. 20 may also be mounted to cover the rear surfaces of the connecting portions (welding portions) 37a and 37c of the lead-out electrodes 32a and 32c and the tab electrodes 34a and 34c.

Accordingly, the connecting portions (welding portions) 37a and 37c of the lead-out electrodes 32a and 32c and the tab electrodes 34a and 34c are under a state where they are interposed between the sealing material 300a at the rear surface and the sealing material 300b at the front surface (see FIG. 24B).

Figure 25:
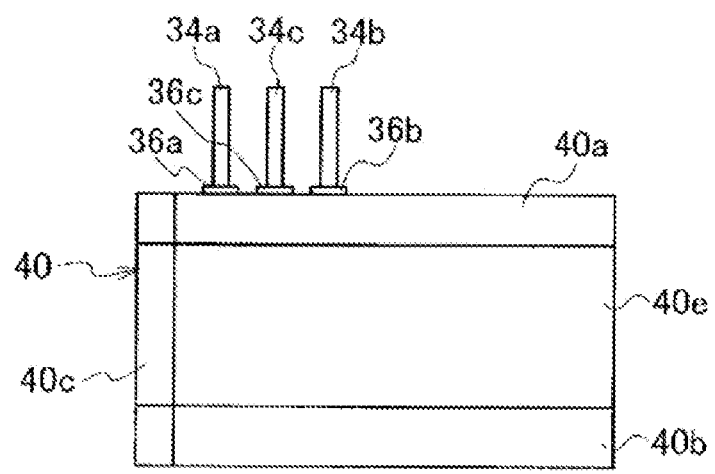
FIG. 25 is a schematic view showing a state where edges of the sheathing laminate sheet are fused in a state where an opening is formed in a portion of the sheathing laminate sheet, according to the second embodiment.

FIG. 25 is a schematic view showing a state where edges 40a, 40b and 40c of the sheathing laminate sheet 40 are fused in a state where an opening 40e is formed in a portion of the sheathing laminate sheet 40.

When the edge 40a of the sheathing laminate sheet 40 is fused, the encapsulation material (sealant) 36a, 36b and 36c is melt at the same time when the sealing material 300a and 300b is thermally melt, and the encapsulation material (sealant) 36a, 36b and 36c and the sealing material 300a and 300b are integrated to seal a gap between the sheathing laminate sheet 40, the lead-out electrodes 32a, 32b and 32c, the tab electrodes 34a, 34b and 34c and the connecting portions (welding portions) 37a, 37b and 37c.

A heating temperature may be, for example, about 200 degrees C. A width for heating (fusing) area may be, for example, about 5 to 6 mm.

Figure 26:
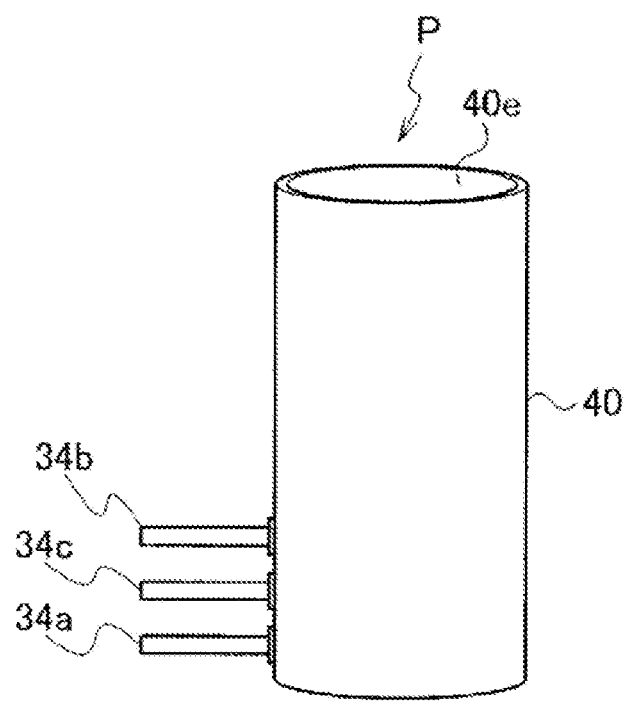
FIG. 26 is a perspective view showing a state where an electrolyte is injected into the sheathing laminate sheet through the opening, according to the second embodiment.
Figure 27:
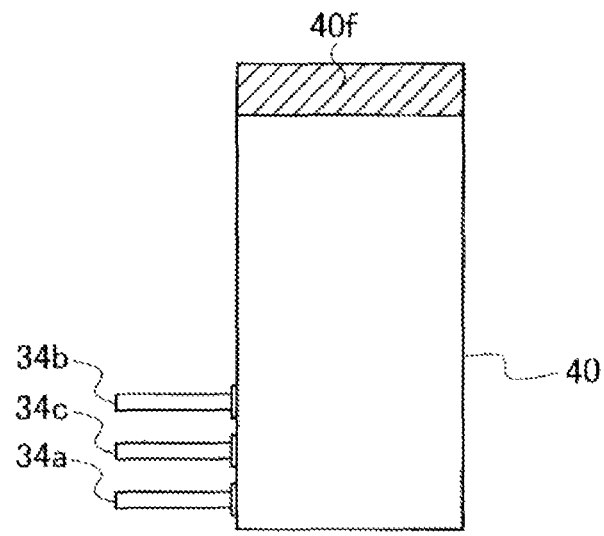
FIG. 27 is a schematic view showing a state where an edge at a side where the opening exists is fused, according to the second embodiment.

Then, an electrolyte is injected into the sheathing laminate sheet 40 through the opening 40e, as shown in FIG. 26, and an edge 40f at a side where the opening 40e exists is fused, as shown in FIG. 27, to complete the laminate type energy device according to this embodiment.

The above-configured laminate type energy device according to this embodiment can prevent a short circuit from occurring between the tab electrodes 34a, 34b and 34c and the sheathing laminate sheet 40 since a step in the connecting portions (welding portions) 37a, 37b and 37c of the lead-out electrodes 32a, 32b and 32c and the tab electrodes 34a, 34b and 34c is completely insulated in a solidification process.

In addition, since the gap between the tab electrodes 34a, 34b and 34c and the sheathing laminate sheet 40 is completely blocked in the solidification process after the encapsulation material (sealant) 36a, 36b and 36c and the sealing material 300a and 300b are melt, it is possible to improve airtightness and prevent an electrolyte P (which will be described later) from being leaked out.

In this way, according to this embodiment, it is possible to improve durability of the laminate type energy device.

In addition, in this embodiment, the lead-out electrodes 32a, 32b and 32c of each cell 130 may be configured such that their respective positive and negative poles are interconnected to connect a plurality of cells 130 in series.

Alternatively, in this embodiment, the lead-out electrodes 32a, 32b and 32c of each cell 130 may be configured such that their respective positive poles are connected to each other and their respective negative poles are connected to each other to connect a plurality of cells 130 in parallel.

(Method of Manufacturing the Laminate Type Energy Device)

The laminate type energy device according to the second embodiment can be manufactured according to the following process.

Specifically, the process includes:

(a) a step of overlapping a plurality of cells 130, each of which has a laminated body of at least two layers laminated such that positive and negative active material electrodes are alternated, with a separator through which an electrolyte and ions are passed, interposed between the positive and negative active material electrodes, and positive and negative lead-out electrodes 32a, 32b and 32c are exposed, (b) a step of welding and joining tab electrodes 34a, 34b and 34c for taking out electricity to the lead-out electrodes 32a, 32b and 32c, respectively (see FIG. 17B, etc.), (c) a step of disposing encapsulation material 36a, 36b and 36c made of thermoplastic resin in end portions of the tab electrodes 34a, 34b and 34c at the side of the cells 130 (see FIG. 17A, etc.), (d) a step of disposing the sealing material 300a and 300b of plate or sheet-shaped thermoplastic resin on the front and rear surfaces of connecting portions 37a, 37b and 37c (see FIGS. 20 to 24), (e) a step of covering the cells 130 with a sheathing laminate sheet 40 (see FIG. 25), (f) a step of thermally melting the encapsulation material 36a, 36b and 36c and the sealing material 300a and 300b and, at the same time, fusing edges 40a, 40b and 40c of the sheathing laminate sheet 40 in a state where an opening 40e is formed in a portion of the sheathing laminate sheet 40 (see FIG. 25), (g) a step of injecting an electrolyte P into the sheathing laminate sheet 40 through the opening 40e (see FIG. 26), and (h) a step of fusing and sealing the opening 40e (see FIG. 27).

In addition, the step of fusing and sealing the opening 40e may be performed in vacuum. When the step of fusing and sealing the opening 40e is performed in vacuum, it is pressed down by the atmospheric pressure to improve adhesion property in the cells 130.

In addition, the number of cells 130 connected in parallel may be three or more.

(Applications)

Figure 28:
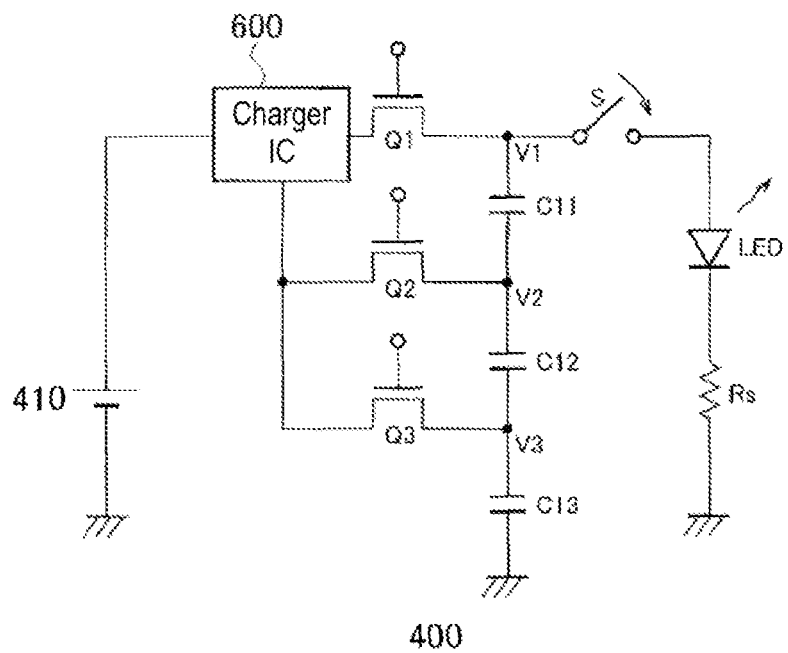
FIG. 28 shows an example circuit configuration of a light emitting device.

The laminate type energy device according to the first and second embodiments may be applied to various electronic devices including, for example, a light emitting device. FIG. 28 shows an example circuit configuration of a light emitting device 400.

In the light emitting device 400, the laminate type energy device according to the first and second embodiments (for example, a laminate type energy device having three cells connected in series) is applied as capacitors C11, C12 and C13, in which, for example, 2.5V, 5V and 7.5V can be obtained as V3, V2 and V1, respectively.

In addition, a chargeable battery 410 is connected to switching transistors (MOS transistors) Q1, Q2 and Q3 via a charger IC 600.

In addition, a light emitting diode (LED) and a resistor Rs are interconnected via a switch S.

Then, the capacitor C3 is charged by the charger IC 600 when the switching transistor Q3 is turned on, and the LED emits light by the voltage V3 when the switch S is closed.

In addition, the capacitors C3 and C2 are charged by the charger IC 600 when the switching transistor Q2 is turned on, and the LED emits light by the voltage V2 when the switch S is closed.

In addition, the capacitors C1, C2 and C3 are charged by the charger IC 600 when the switching transistor Q1 is turned on, and the LED emits light by the voltage V1 when the switch S is closed.

In this way, compactness and high durability of the laminate type energy device according to the first and second embodiments can make a contribution to improved durability and long life of the light emitting device 400 of the LED flash.

[Other Embodiments]

While the present disclosure has been described by way of the particular embodiments, it should be understood that the description and the drawings constituting a part of the present disclosure are only illustrative. It is apparent to those skilled in the art that the embodiments may be modified, altered, changed and operated in various different ways when reading from the detailed description and the drawings.

Thus, the present disclosure encompasses other different embodiments which are not described herein.

For example, the configuration and manufacturing method of the first or second embodiment of the present disclosure can be applied to an electric double layer capacitor to improve its insulation, airtightness and durability.

Figure 29:
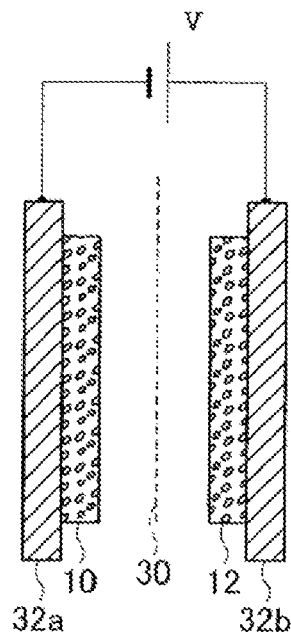
FIG. 29 is a front view showing an internal electrode of an electric double layer capacitor.

FIG. 29 illustrates a basic structure of an internal electrode of an electric double layer capacitor. The internal electrode of the electric double layer capacitor is configured such that lead-out electrodes 32a and 32b are exposed from at least one layer of active material electrodes 10 and 12 and are connected to a power source voltage, with a separator 30 through which only ions of an electrolyte are passed, interposed between the active material electrodes 10 and 12. The lead-out electrodes 32a and 32b are made of, for example, an aluminum foil and the active material electrodes 10 and 12 are made of, for example, activated carbon. The separator 30 is larger (or wider) than the active material electrodes 10 and 12 to cover the entire active material electrodes 10 and 12. The separator 30 is required to have heat resistance if it needs to cope with reflow. The separator 30 may be made of polypropylene or the like if no heat resistance is needed. Otherwise, if heat resistance is needed, the separator 30 may be made of celluloses. The internal electrode of the electric double layer capacitor is impregnated with an electrolyte and only ions of the electrolyte are migrated through the separator 30 at the time of charging/discharging.

As another example, the configuration and manufacturing method of the first or second embodiment of the present disclosure can be applied to a lithium ion capacitor to improve its insulation, airtightness and durability.

Figure 30:
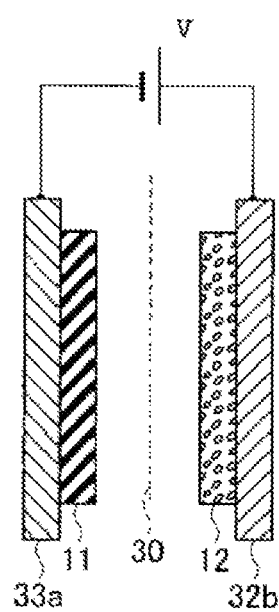
FIG. 30 is a front view showing an internal electrode of a lithium ion capacitor.

FIG. 30 illustrates a basic structure of an internal electrode of a lithium ion capacitor. The internal electrode of the lithium ion capacitor is configured such that lead-out electrodes 33a and 32b are exposed from at least one layer of active material electrodes 11 and 12 and are connected to a power source voltage, with a separator 30 through which only ions of an electrolyte are passed, interposed between the active material electrodes 11 and 12. The positive active material electrode 12 are made of, for example, activated carbon and the negative active material electrode 11 are made of, for example, Li-doped carbon. The positive lead-out electrode 32b is made of, for example, an aluminum foil and the negative lead-out electrode 33a is made of, for example, a copper foil. The separator 30 is larger (or wider) than the active material electrodes 11 and 12 to cover the entire active material electrodes 11 and 12. The internal electrode of the lithium ion capacitor is impregnated with an electrolyte and only ions of the electrolyte are migrated through the separator 30 at the time of charging/discharging.

As another example, the configuration and manufacturing method of the first or second embodiment of the present disclosure can be applied to a lithium ion battery to improve its insulation, airtightness and durability.

Figure 31:
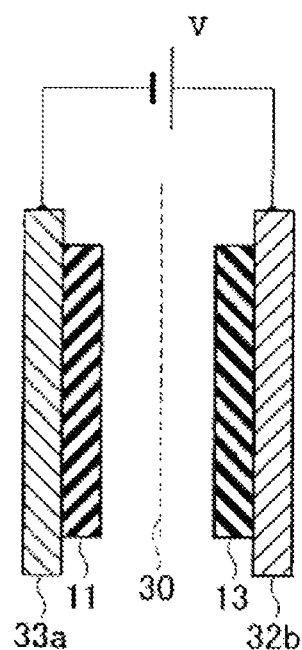
FIG. 31 is a front view showing an internal electrode of a lithium ion battery.

FIG. 31 illustrates a basic structure of an internal electrode of a lithium ion battery. The internal electrode of the lithium ion battery is configured such that lead-out electrodes 33a and 32b are exposed from at least one layer of active material electrodes 11 and 13 and are connected to a power source voltage, with a separator 30 through which only ions of an electrolyte are passed, interposed between the active material electrodes 11 and 13. The positive active material electrode 13 are made of, for example, $LiCoO_2$ and the negative active material electrode 11 are made of, for example, Li-doped carbon. The positive lead-out electrode 32b is made of, for example, an aluminum foil and the negative lead-out electrode 33a is made of, for example, a copper foil. The separator 30 is larger (or wider) than the active material electrodes 11 and 13 to cover the entire active material electrodes 11 and 13. The internal electrode of the lithium ion battery is impregnated with an electrolyte and only ions of the electrolyte are migrated through the separator 30 at the time of charging/discharging.

INDUSTRIAL APPLICABILITY

The laminate type energy device of the present disclosure can be applied to an LED-Flash module, a communication (high power) module, a solar cell module, a power module, a backup power supply for a toy and the like, a storage device for energy harvesting, a storage device for sensor network, etc. In addition, the laminate type energy device of the present disclosure can be applied to an electric double layer capacitor, a lithium ion capacitor, a lithium ion battery and the like.

In addition, the internal electrode of the electric double layer capacitor can be applied to an LED-Flash, a power supply for motor driving (for example, for a toy), a storage device for electric automobile (for example, for regeneration and starter), an energy storage device from a solar cell or vibration power generator, a power storage device for high power communication, an environment-resistant storage device (for example, a storage device for road rivet and a storage device of bicycle light) and the like. The internal electrode of the lithium ion capacitor can be applied to an energy storage device from a solar cell or wind power generator, a power supply for motor driving, etc. The internal electrode of the lithium ion battery can be applied to a battery for portable equipment, a storage device for electric automobile (in normal operation), a large-scale storage device (for common household), etc.

According to the present disclosure in some embodiments, it is possible to provide a laminate type energy device which is capable of improving its insulation, airtightness and durability, and a method of manufacturing the same.

While certain embodiments have been described, these embodiments have been presented by way of example only and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A laminate type energy device comprising:
   a plurality of cells, each having a laminated body of at least two layers laminated such that positive and negative electrodes are alternated with a separator through which an electrolyte and ions are passed, being interposed between the positive and negative active material electrodes, and positive and negative lead-out electrodes are exposed,
   wherein tab electrodes that allow electricity to flow outside of the laminate type energy device are joined to the lead-out electrodes via connecting portions, and
   wherein the cells are sealed by a sheathing laminate sheet via a sealing material covering at least the connecting portions,
      wherein the sealing material is made of plate or sheet-shaped thermoplastic resin, and
      wherein an encapsulation material is melt at the same time when the sealing material is thermally melt, and the encapsulation material and the sealing material are integrated to seal a gap between the sheathing laminate sheet, the lead-out electrodes, the tab electrodes and the connecting portions.

2. The laminate type energy device of claim 1, wherein the plate or sheet-shaped thermoplastic resin is placed on front and rear surfaces of the connecting portions, thermally melt in that state, and solidified.

3. The laminate type energy device of claim 1, wherein the connecting portions are welding portions between the lead-out electrodes and the tab electrodes.

4. The laminate type energy device of claim 1, wherein encapsulation material made of thermoplastic resin is provided at end portions of the tab electrodes at the side of the cells.

5. The laminate type energy device of claim 1, wherein the thermoplastic resin is polypropylene.

6. The laminate type energy device of claim 1, wherein the lead-out electrodes of each cell are configured such that their respective positive and negative poles are interconnected to connect the plurality of cells in series.

7. The laminate type energy device of claim 1, wherein the lead-out electrodes of each cell are configured such that their respective positive poles are connected to each other and their respective negative poles are connected to each other to connect the plurality of cells in parallel.

8. A laminate type energy device comprising:
   a plurality of cells, each having a laminated body of at least two layers laminated such that positive and negative electrodes are alternated with a separator through which an electrolyte and ions are passed, being interposed between the positive and negative active material electrodes, and positive and negative lead-out electrodes are exposed,
   wherein tab electrodes that allow electricity to flow outside of the laminate type energy device are joined to the lead-out electrodes via connecting portions,
      wherein the cells are sealed by a sheathing laminate sheet via a sealing material covering at least the connecting portions, and
      wherein the sheathing laminate sheet comprises a thermoplastic resin film and a high melting point resin film, with a metal foil interposed therebetween, and covers the cells such that the high melting point resin film lies in the outer side.

9. A method of manufacturing a laminate type energy device, comprising:
- connecting a plurality of cells, each of which has a laminated body of at least two layers laminated such that positive and negative electrodes are alternated, with a separator through which an electrolyte and ions are passed, being interposed between the positive and negative active material electrodes, and positive and negative lead-out electrodes are exposed;
- welding and joining tab electrodes that allow electricity to flow outside of the laminate type energy device to the lead-out electrodes via connecting portions;
- disposing encapsulation material made of thermoplastic resin in end portions of the tab electrodes at the side of the cells;
- disposing plate or sheet-shaped thermoplastic resin constituting sealing material on front and rear surfaces of the connecting portions;
- covering the cells with a sheathing laminate sheet;
- thermally melting the encapsulation material and the sealing material and, at the same time, fusing edges of the sheathing laminate sheet in a state where an opening is formed in a portion of the sheathing laminate sheet;
- injecting an electrolyte into the sheathing laminate sheet through the opening; and
- fusing and encapsulating the opening.

10. The method of claim 9, wherein the fusing and encapsulating the opening is performed in a vacuum.

11. A laminate type energy device comprising:
- a cell including a separator through which an electrolyte and ions are passed, positive and negative active material electrodes between which the separator is interposed, and lead-out electrodes, each of the lead-out electrodes corresponding to each of the positive and negative active material electrodes;
- tab electrodes, each of the tab electrodes joined to each of the lead-out electrodes;
- an insulating member disposed on connecting portions connecting the lead-out electrodes and the tab electrodes; and
- a laminate sheet connected to the cell having the electrolyte and having the insulating member interposed between the connecting portions.

12. The laminate type energy device of claim 11, wherein the insulating member is made of a thermoplastic resin.

13. The laminate type energy device of claim 12, wherein the thermoplastic resin is polypropylene.

* * * * *